United States Patent [19]

Lee et al.

[11] Patent Number: 5,066,699

[45] Date of Patent: Nov. 19, 1991

[54] STORAGE STABLE HEAT CURABLE ORGANOSILOXANE COMPOSITIONS CONTAINING A MICROENCAPSULATED CATALYST AND METHOD FOR PREPARING SAID CATALYST

[75] Inventors: Chi-Long Lee; Ming-Hsiung Yeh, both of Midland, Mich.

[73] Assignee: Dow Corning Corporation, Midland, Mich.

[21] Appl. No.: 575,780

[22] Filed: Aug. 31, 1990

[51] Int. Cl.$^5$ ............................................. C08K 5/05
[52] U.S. Cl. .................................. 524/379; 524/386; 528/15; 528/31; 528/32; 528/12; 528/26; 528/20
[58] Field of Search .................. 528/15, 26, 12, 20, 528/32, 31; 524/379, 386

[56] References Cited

U.S. PATENT DOCUMENTS

| | | | |
|---|---|---|---|
| 4,293,677 | 10/1981 | Imai | 528/15 |
| 4,421,903 | 12/1983 | Ashby | 528/15 |
| 4,461,854 | 7/1984 | Smith | 523/211 |
| 4,481,341 | 11/1984 | Schlak et al. | 525/478 |
| 4,528,354 | 7/1985 | McDougal | 528/33 |
| 4,546,164 | 9/1985 | Shen et al. | 528/15 |
| 4,604,444 | 8/1986 | Donnadieu et al. | 528/34 |
| 4,766,176 | 8/1988 | Lee et al. | 525/100 |
| 4,784,879 | 11/1988 | Lee et al. | 427/213.34 |
| 4,874,667 | 10/1989 | Lee et al. | 128/102.22 |

FOREIGN PATENT DOCUMENTS 49-134786  6/1974  Japan .

*Primary Examiner*—Melvyn I. Marquis
*Assistant Examiner*—Margaret W. Glass
*Attorney, Agent, or Firm*—Robert Spector

[57] ABSTRACT

The present invention provides microencapsulated liquid or solubilized curing catalysts for one-part heat curable organosiloxane compositions. The curing catalysts are prepared by the photoinitiated polymerization of at least one solubilized hydroxyl-containing ethylenically unsaturated organic compound in the presence of a photoinitiator for the polymerization of said compound, an optional surfactant, and a liquid or solubilized curing catalyst for organosiloxane compositions. The curing agent is in the form of coordination complex with an ethylenically or acetylenically unsaturated organic compound and the solvent for the polymerization reaction is a mono- or polyhydric alcohol. At least a portion of the present microcapsules are less than one micron in diameter, and substantially all are less than about three microns in diameter. Compositions containing the preferred platinum group metals as catalysts are optically transparent.

11 Claims, No Drawings

STORAGE STABLE HEAT CURABLE ORGANOSILOXANE COMPOSITIONS CONTAINING A MICROENCAPSULATED CATALYST AND METHOD FOR PREPARING SAID CATALYST

BACKGROUND OF THE INVENTION

1. Field of the Invention

This invention relates to organosiloxane compositions that cure by means of catalyzed reactions. More particularly, this invention relates to one-part organosiloxane compositions containing a novel microencapsulated curing catalyst. The compositions exhibit long term storage stability under ambient conditions yet cure rapidly at elevated temperatures.

2. Description of the Prior Art

Organosiloxane compositions cure by a variety of reactions. Some of the more common curing means involve 1) a free radical reaction initiated by the heat-induced decomposition of an organic peroxide or the decomposition of a photoinitiator in the presence of ultraviolet light and 2) the reaction between a hydroxyl-containing polyorganosiloxane and an organosilicon compound containing two or more hydrolyzable groups that occurs under ambient conditions in the presence of moisture and a suitable catalyst.

One of the more useful classes of polyorganosiloxane compositions cures by a reaction between silicon-bonded hydrogen atoms and either silicon bonded alkenyl radicals or hydroxyl groups. These reactions are catalyzed by metals from the platinum group of the periodic table or compounds of these metals. The advantages of these compositions include their rapid curing rate, particularly at elevated temperatures, the absence of objectionable by-products produced during the curing of compositions containing organic peroxides or silanes with hydrolyzable groups such as acetoxy or methoxy, and the difficulty of achieving complete curing of moisture-curable organosiloxane compositions applied in thick layers.

Compositions that cure by a hydrosilation reaction typically contain a polydiorganosiloxane with at least two ethylenically unsaturated hydrocarbon radical per molecule, an organohydrogensiloxane containing at least two silicon bonded hydrogen atoms per molecule in an amount sufficient to achieve curing of the composition and a platinum-or rhodium-containing catalyst in an amount sufficient to promote curing of the composition. Fillers and other additives may be present for the purpose of modifying physical and/or chemical properties of the composition either prior to or following curing.

Because organosiloxane compositions that cure by a platinum-catalyzed hydrosilation reaction begin to cure even at ambient temperature once the reactants are combined, the catalyst and the organohydrogensiloxane reactant are usually packaged in separate containers and are not combined until it is desired to cure the composition. Even if the composition contains one or more of the known platinum catalyst inhibitors it cannot be stored in a single container for more than a few hours.

One of the alternatives proposed in the prior art to supplying platinum-catalyzed curable organosiloxane compositions as two-package materials is to isolate either the catalyst or the organohydrogensiloxane within a matrix of a material that is solid under the conditions encountered during storage of the curable composition, yet allows the entrapped reactant or catalyst to escape and mix with the other ingredients when it is desired to cure the composition.

The prior art discloses a number of different one-part curable organosiloxane compositions containing microencapsulated reactants or catalysts. An example of this type of composition is described in U.S. Pat. No. 4,528,354, which issued to McDougal and Dougherty on July 9, 1985. This patent describes one-part peroxide curable silicone rubber compositions. The compositions include a microencapsulated liquid phase containing an organic peroxide in a shell of a resinous thermosetting material that is impervious to the peroxide.

The capsules are designed to rupture under a given internal vapor pressure that is generated by the encapsulated liquid when the curable composition containing the microcapsules is heated.

Because release of the peroxide is dependent upon rupturing rather than melting of the shell separating the peroxide from the other ingredients of the organosiloxane composition, the composition and thickness of the shell must be carefully controlled to ensure that the rupture of the capsules will occur reproducibly within the temperature range used to cure the organosiloxane composition.

U.S. Pat. No. 4,604,444, which issued to Donnadieu on Aug. 5, 1986 describes storage stable polyorganosiloxane compositions comprising a polyhydroxylated polyorganosiloxane, a polyfunctional acyloxysilane and a microencapsulated accelerator that either contains or generates water. The encapsulated material can be released using heat and/or irradiation. Suitable encapsulating materials include polystyrene, acrylonitrile-styrene copolymers, and poly(methyl methacrylate). This patent does not suggest using microencapsulated materials in organosiloxane compositions curable by means other than the reaction of polyhydroxylated polyorganosiloxanes with acyloxysilanes.

U.S. Pat. No. 4,461,854, which issued to Smith on July 24, 1984 teaches two-part curable organosiloxane compositions. One part contains a silanol-terminated polyorganosiloxane and the second component contains a curing agent, a filler and an encapsulated catalyst. The catalyst is a specified group of metal salts of carboxylic acids where the metal is, for example, tin, lead or zirconium. The encapsulating material is preferably a salt of a carboxylic acid that does not promote room temperature curing of the composition. The encapsulated catalyst prolongs the bath life of the curable composition.

U.S. Pat. No. 4,293,677, which issued to Imai on Oct. 6, 1981 describes encapsulating organohydrogensiloxanes using complex coacervation and in-situ polymerization, two of the most common microencapsulation techniques.

The in-situ polymerization process exemplified in example 2 of the Imai patent involves the polymerization of styrene in the presence of a dimethylsiloxane-/methylhydrogensiloxane copolymer as the dispersed phase of an emulsion wherein the aqueous phase contains a solubilized polyvinyl alcohol and potassium persulfate.

A disadvantage of encapsulating the organohydrogensiloxane reactant as taught by Imai et al. is the relatively large amount of encapsulating polymer that is introduced into the composition. Many of the thermoplastic organic polymers suitable for use as encapsulants are incompatible with the reactants present in the curable composition. The presence of relatively large amounts of incompatible polymers may detract from the appearance, physical properties and optical properties of the cured material.

One way to reduce the amount of incompatible encapsulating polymer introduced into a curable composition is to encapsulate the platinum-containing catalyst rather than the organohydrogensiloxane reactant as taught by Imai et al. One of the most effective classes of catalysts for curing organosiloxane compositions of the type described in the Imai et al. patent are reaction products of an inorganic platinum compound such as chloroplatinic acid with liquid vinyl-containing organosilicon compounds such as sym-tetramethyldivinyldisiloxane. The solution can then be diluted to the desired platinum content, typically between 0.1 and 1 percent by weight, using a liquid dimethylvinylsiloxy terminated polydimethylsiloxane. Alternatively, the undiluted reaction product can be used as a catalyst.

U.S. Pat. No. 4,481,341, which issued to Schlak et al. on Nov. 6, 1984 and Japanese published application no. 49/134,786, published on Dec. 25, 1974 describe thermosetting organosiloxane compositions comprising a polyorganosiloxane containing at least two ethylenically unsaturated hydrocarbon radicals per molecule, a polyorganohydrogensiloxane containing at least two silicon bonded hydrogen atoms per molecule and a platinum-containing catalyst that is dispersed in a finely divided, solid matrix, such as a silicone resin or an organic resin. The concentration of catalyst is from 0.001 to 5 percent by weight of platinum metal.

The finely divided material in which the catalyst is dispersed is virtually insoluble in either the aforementioned polyorganosiloxane or polyorganohydrogensiloxane and melts or softens at a temperature between 70 and 250 degrees C. The alleged advantage of the compositions disclosed in the patent to Schlak et al. is that the catalyst remains isolated from the other ingredients of the curable composition until the composition is heated sufficiently to melt the material in which the catalyst is dispersed. Because the organosilicon compounds present in the composition will not cure in the absence of the catalyst, the composition can allegedly be stored for long periods of time without undergoing curing or even an increase in viscosity.

A disadvantage of the curable organosiloxane compositions described by Schlak et al. and the published Japanese patent application is the method taught to prepare the catalyst/resin composition. A solid block or sheet of resin containing the platinum composition dispersed throughout is ground to a fine powder. Based on the random nature of the grinding operation there is a reasonable probability that some of the particles will contain platinum catalyst on their surface. Even trace amount of platinum have been shown to cause premature curing of the type of organosiloxane composition exemplified in this patent.

One way to avoid the inherent disadvantages of the catalyst compositions described in the Schlak et al. patent, is to completely microencapsulate finely divided particles or droplets of a catalyst composition within a material that is impermeable to the catalyst and effectively isolates it from the reactive ingredients of a curable organosiloxane composition. The encapsulant melts or softens at the desired curing temperature of the composition. A variety of methods for microencapsulating materials are known in the art.

U.S. Pat. No. 4,874,667, which issued on Oct. 17, 1989 to Lee et al. and is assigned to the same party as the present application discloses one-part organosiloxane compositions that cure by a platinum-catalyzed hydrosilation reaction. The platinum catalyst is microencapsulated in one or two layers of a thermoplastic organic polymer. The diameter of the microencapsulated catalyst particles are less than 100 microns.

A disadvantage of the preparative methods described in the Lee et al. patent and related U.S. Pat. No. 4,766,176, issued on Aug. 23, 1988 and U.S. Pat. No. 4,784,879, issued on Nov. 15, 1988, is the inability of these methods to yield microencapsules of sufficiently small size that curable compositions containing these microcapsules are optically transparent. Curable compositions containing these microcapsules are translucent or opaque.

U.S. patent application Ser. No. 07/431,352, now U.S. Pat. No. 5,036,117 filed on Nov. 3, 1989 and assigned to the same party as the present application, is directed to heat curable silicone compositions useful for application to paper as release coatings. The compositions comprise (1) an organosilicon compound containing a plurality of silicon bonded hydroxyl groups and/or alkenyl radicals, (2) an organohydrogensiloxane containing an average of at least two silicon-bonded hydrogen atoms per molecule, (3) a platinum group metal-containing catalyst in an amount sufficient to accelerate curing of the composition and (4) a platinum catalyst inhibitor in an amount sufficient to retard the curing reaction at room temperature but insufficient to prevent the reaction at elevated temperature. The composition is typically in the form of a coating bath. A continuous length of paper or other material to be coated is drawn from a feed roll, passed through the coating bath and cured prior to being wound on to a take-up roll.

The inventive ingredient in the composition is a bath life extender which itself is ineffective in prolonging the useful life of the curable composition, but when used in combination with the platinum catalyst inhibitor extends the useful life of the composition at room temperature without substantially lengthening the time required to cure the composition at the typical curing temperatures of from about 70° to 120° C.

Useful bath life extenders are defined in terms of their Hansen partial solubility parameter for hydrogen bonding. This parameter is greater than 8.0 for useful bath life extenders, a preferred range being from 13 to 48. Preferred bath life extenders are organic compounds containing one or more primary and/or secondary alcoholic hydroxyl groups, carboxylic acids, cyclic ethers and water. Primary and secondary alcohols are particularly preferred bath life extenders. Bath lives of greater than 168 hours are reported for the combination of diethyl fumarate as the catalyst inhibitor and benzyl alcohol as the bath life extender.

The present inventors modified the composition described in the aforementioned application Ser. No. 07/431,352 by replacing the bath life extender with a hydroxy-substituted ester of a polymerizable ethylenically unsaturated acid. When the ester was subsequently polymerized the resultant composition exhibited a surprising increase in long-term storage stability relative to compositions containing the bath life extenders described in the patent application. Examination of the composition under an electron microscope revealed the platinum group metal catalyst in the form of discrete microcapsules exhibiting diameters of less than three microns.

The present inventors believe that the same method used by them to extend the storage life of curable organosiloxane compositions containing platinum group metal-containing catalysts is applicable to other 1-part organosiloxane compositions whose cure rate is accelerated in the presence of metal-containing catalysts that form complexes with ethylenically or acetylenically unsaturated organic compounds.

One objective of this invention is to provide a novel type of microencapsulated platinum group metal-containing curing catalyst that does not detract from the optical transparancy or the cure rate at elevated temperatures of curable organosiloxane compositions containing the catalyst.

A second objective is to provide a method for preparing microencapsulated catalysts containing compounds of platinum group metals and compounds of other metals that are effective curing catalysts for organosiloxane compositions.

Another objective is to provide optically transparent one-part storage stable organosiloxane compositions containing the microencapsulated curing catalysts of this invention.

SUMMARY OF THE INVENTION

The present invention provides microencapsulated liquid or solubilized curing catalysts for one-part heat curable organosiloxane compositions. Compositions containing the preferred platinum group metal catalysts are optically transparent in the absence of opacifying additives in addition to exhibiting long-term storage stability. At least a portion of these microcapsules are less than one micron in diameter, and substantially all are less than about three microns in diameter.

The microencapsulated curing catalysts of this invention are prepared by the photoinitiated polymerization of at least one solubilized hydroxyl-containing ethylenically unsaturated organic compound in the presence of a photoinitiator for the polymerization of said compound, an optional surfactant, and a liquid or solubilized curing catalyst for organosiloxane compositions. The curing catalyst is in the form of a coordination complex with an ethylenically or acetylenically unsaturated organic compound and the solvent for the polymerization reaction is a mono-or polyhydric alcohol containing at least two carbon atoms.

When the curing catalyst is a compound of a platinum group metal, the coordinating agent preferably includes at least one of the known ethylenically or acetylenically unsaturated inhibitors for platinum-catalyzed hydrosilation reactions.

DETAILED DESCRIPTION OF THE INVENTION

This invention provides an improved one-part, storage stable, heat curable organosiloxane composition comprising A. a liquid or gum type curable polyorganosiloxane containing at least two groups selected from a first class of reactive groups that react with a second class of reactive groups present on the curing agent during curing of said composition;

B. a curing agent for said composition selected from organosilicon compounds containing at least two of said second class of reactive groups where the concentration of said curing agent is sufficient to cure said composition in the presence of a curing catalyst, the sum of the average number of said first class of reactive groups per molecule of polyorganosiloxane (A) and the average number of said second class of reactive groups per molecule of curing agent (B) is greater than 4, and C. an amount of a microencapsulated liquid or solubilized curing catalyst sufficient to promote curing of said composition at elevated temperatures, where said catalyst is microencapsulated within a matrix or layer of a synthetic organic polymer derived from an ethylenically unsaturated organic compound.

The improvement comprises the presence of a microencapsulated curing catalyst in the form of a liquid composition that has been prepared by (1) forming a first solution comprising (a) a hydroxyl-containing ethylenically unsaturated organic compound, (b) a photoinitiator in an amount sufficient to initiate polymerization of said unsaturated organic compound in the presence of ultraviolet light to form a thermoplastic polymer, (c) a curing catalyst in the form of a coordination complex of a metal with (i) an ethylenically or acetylenically unsaturated organic compound or (ii) the residue remaining following removal of the hydrogen atom from the carboxyl group of a carboxylic acid, where the solvent portion of said solution is a mono- or polyhydric alcohol, said metal is selected from the group consisting of platinum group metals and titanium;

(2) irradiating said first solution with an amount of ultraviolet light sufficient to polymerize said hydroxyl-containing ethylenically unsaturated compound and thereby form said microencapsulated curing catalyst as a dispersion of particles in a second solution comprising said solvent and a portion of the polymer formed from said compound, where a majority of said particles are less than one micron in diameter and substantially none exceed three microns in diameter.

A characteristic feature of preferred curable organosiloxane compositions containing a microencapsulated compound of a platinum group metal as the curing catalyst is their optical transparency. The transparency is believed due to the sub-micron diameter of at least a major portion, typically at least 50 percent, of the microcapsules and the low concentration of microcapsules required to achieved a rapid cure rate at elevated temperatures. Substantially none of the present microcapsules are larger than about 3 microns in diameter.

The present invention also provides a method for preparing microencapsulated curing catalysts exhibiting this size range.

Because the catalyst is effectively isolated from the other ingredients of the curable composition until the composition is heated to the melting or softening point of the thermoplastic polymer portion of the microcapsule, the compositions are stable for extended periods of time, typically several months or longer, under ambient conditions, yet cure rapidly at temperatures above the melting or softening point of the thermoplastic microencapsulant.

The present method for preparing microencapsulated curing catalysts is particularly suitable for but not limited to microencapsulated liquid or solubilized coordination compounds of platinum group metals, referred to hereinafter as "platinum-containing hydrosilation catalysts". These compounds are effective curing catalysts for organosiloxane compositions curable by a hydrosilation reaction or by the reaction between hydroxyl groups and silicon-bonded hydrogen atoms.

The curable organosiloxane composition comprises at least one polyorganosiloxane containing two or more hydroxyl groups or terminally unsaturated hydrocarbon radicals per molecule as the first class of reactive group and, as the curing agent a polyorganosiloxane containing two or more silicon-bonded hydrogen atoms as the second class of reactive group.

Other curing catalysts and accelerators for organosiloxane compositions that can be microencapsulated using the present method include but are not limited to coordinated compounds of titanium with organic chelating agents such as esters of acetoacetic acid.

Because of the large amount of titanium and other types of catalysts typically required to achieve rapid curing of organosiloxane composition at temperatures above about 70° C. relative to the concentration of platinum group metals required to achieve a comparable cure rate, the corresponding concentration of microcapsules in the composition may be above the limit required for optical transparency. Curable compositions containing microencapsulated catalysts other than compounds of platinum group metals may therefore not exhibit the optical properties of compositions containing these preferred catalysts.

The average diameter of microcapsules prepared using the method of this invention is less than three microns. Preferably the diameter of at least a portion of the microcapsules is less than one micron.

The Coordinated Curing Catalyst

The platinum-containing hydrosilation catalysts and other types of curing catalysts and accelerators for curable organosiloxane compositions that can be microencapsulated in accordance with the present method must be in the form of a coordination complex that is miscible with or soluble in the mono- or polyhydric alcohol used as the solvent for polymerization of the hydroxyl-containing ethylenically unsaturated organic compound that encapsulates the curing catalyst. It should be understood that the curing catalyst must not dissolve or degrade the encapsulating polymer.

To avoid premature rupturing of the microcapsules during storage the curing catalyst should not have a significant vapor pressure at temperatures from 25 to about 60 degrees C.

A particularly preferred class of curing catalysts include coordination complexes of titanium and platinum. Coordinated platinum compounds are most preferably derived from halide compounds of platinum group metals such as chloroplatinic acid. The chloroplatinic acid can be initially present as the commercially available hexahydrate or in the anhydrous form disclosed by Speier in U.S. Pat. No. 2,823,218.

Platinum-containing hydrosilation catalysts suitable for preparing the microencapsulated catalysts of this invention include reaction products of chloroplatinic acid with an aliphatically unsaturated organosilicon compound such as symdivinyltetramethyldisiloxane. These reaction products are described by Willing in U.S. Pat. No. 3,419,593 and incorporated herein by reference. Other platinum-containing hydrosilation catalysts considered useful for preparing the present microencapsulated catalysts include those described in U.S. Pat. Nos. 3,159,601; 3,159,602; 3,220,972; 3,296,291; 3,516,946; 3,814,730; and 3,928,629, all of which are incorporated herein by reference as disclosures of platinum-containing hydrosilation catalysts.

Platinum-containing hydrosilation catalysts form coordination complexes with ethylenically or acetylenically unsaturated silicon or organic compounds. These compounds include organosilicon compounds such as the tetramethyldivinyldisiloxane, present as the coordinating agent in preferred platinum-containing hydrosilation catalysts, and many of the inhibitors used to retard the activity of the catalyst at temperatures below about 50 degrees C.

Even when the coordinating agent is a poor or moderate catalyst inhibitor, such as the aforementioned ethylenically unsaturated organosilicon compounds, compositions for preparing microencapsulated platinum-containing hydrosilation catalysts preferably include at least one of the known effective inhibitors capable of forming coordination complexes with platinum-containing hydrosilation catalysts. Suitable inhibitors include but are not limited to acetylenic compounds, particularly alcohols such as 2-methyl-3-butyn-2-ol and 1-ethynyl-1-cyclohexanol, described in U.S. Pat. No. 3,445,420 and 4,347,346; and esters of ethylenically unsaturated acids, such as diethyl fumarate and bis(2-methoxyisopropyl)maleate, that are described in U.S. Pat. No. 4,256,870; 4,476,166 and 4,562,096. The alcohol portion of these esters preferably contains from 1 to 4 carbon atoms.

Ethylenically or acetylenically unsaturated organic compounds containing one or more polar groups such as carbonyl or hydroxyl are particularly preferred coordinating agents for platinum-containing hydrosilation catalysts.

The concentration of inhibitor required to prepare microencapsulated platinum-containing hydrosilation catalysts providing the desired long-term storage stability for a particular curable organosiloxane composition will depend upon a number of variables, including but not limited to the type and concentration of catalyst, the type and relative amounts of the ingredients referred to in the preceding portion of this specification as (A) and (B), and the presence of optional ingredients.

For many applications the amount of inhibitor should be sufficient to provide from about 25 to about 500 moles of inhibitor for every mole of platinum group metal present in the curable composition. Using the preferred esters of either maleic or fumaric acid as the inhibitor, as little as 25 moles of the inhibitor per mole of platinum is sufficient to prepare the present microencapsulated platinum-containing hydrosilation catalysts.

Preparation of the Microencapsulated Catalyst

The present microencapsulated curing catalysts are prepared by the photoinitiated polymerization of at least one solubilized hydroxyl-containing ethylenically unsaturated organic compound in the presence of (a) the curing catalyst as a solubilized coordination complex and (b) a mono- or polyhydroxylated alcohol as the solvent.

The Alcohol

Suitable solvents for the polymerization of the hydroxyl-containing ethylenically unsaturated organic compound are alcohols containing from 2 to about 10 carbon atoms and one or two hydroxyl groups. Representative alcohols include but are not limited to ethanol, the isomeric propanols, butanols and hexanols as monohydric alcohols and ethylene and propylene glycols as dihydric alcohols.

Water and methanol are considered unsuitable solvents for the polymerization of the hydroxyl-containing ethylenically unsaturated organic compound. Polymerizations conducted in these solvents typically yield a gel rather than the desired liquid dispersion of microencapsulated curing catalyst. While the gel can be mechanically disintegrated, the particle size of the resultant microencapsulated curing catalyst is too large to yield optically transparent organosiloxane compositions.

The Hydroxyl-Containing Organic Compound (Monomer)

The hydroxyl-containing ethylenically unsaturated organic compound, referred to hereinafter as a monomer, can be any of those that will polymerize in the presence of ultraviolet radiation and a photoinitiator to form a polymer that is insoluble in the liquid polymerization medium. Preferred monomers are (a) vinyl esters of carboxylic acids, such as vinyl acetate, that are at least partially hydrolyzed following polymerization, (b) hydroxyl-containing ethylenically unsaturated carboxylic acids, (c) esters derived from one of these carboxylic acids and (d) esters derived from an ethylenically unsaturated carboxylic acid such as acrylic or methacrylic acid and a substantially equimolar amount of an alcohol containing at least two hydroxyl groups per molecule.

Monomers selected from group (d) are preferred, and include but are not limited to 2-hydroxyethyl acrylate and 2-hydroxyethyl methacrylate.

Any of the monomers suitable for use in the present method can be present individually or as mixtures containing two or more monomers.

The present inventors found the presence of hydroxyl groups on the monomer essential to preparation of the microencapsulated curing catalysts of this invention.

The concentration of monomer in the polymerization reaction mixture is not critical. The monomer concentration is typically determined based on the desired viscosity of the final composition containing the microencapsulated curing catalyst as the dispersed phase. Typically from 1 to about 50 weight percent of monomer, based on the weight of the polymerization reaction mixture, can be present. A monomer concentration of from 1 to about 20 weight percent is preferred.

The Photoinitiator

Any of the known photoinitiators can be used to initiate polymerization of the monomer in the presence of ultraviolet light. Useful photoinitiators include but are not limited to benzophenones, substituted benzophenones, benzil, substituted benzils, acetophenone and substituted acetophenones. Preferred photoinitiators include 2-ethoxy-2-methylacetophenone, 3-bromoacetophenone, 4-methylbenzophenone, and photoinitiators available under the trade name Darocure(R) from Merck and Company, Inc. and Irgacure(R) from Ciba-Geigy.

The Optional Surfactant

The reaction mixture used to prepare the present microencapsulated curing catalysts optionally contain a surfactant to facilitate polymerization of the hydroxyl-substituted monomer and formation of the microcapsules. Any of the known surfactants of the anionic, cationic or non-ionic type can be used for this purpose so long as they are compatible with the polymerization reaction mixture and do not interfere with the formation of the present microcapsules. Preferred surfactants are of the anionic type available under the trade name "Triton" from Rohm and Haas Chemical Co.

Polymerization of the Monomer

The microencapsulated curing catalysts of this invention are formed by exposing the composition containing the hydroxyl-containing monomer(s), coordinated curing catalyst, photoinitiator and optional surfactant to ultraviolet (UV) light for a period of time sufficient to polymerize the monomer around the micelles of coordinated curing catalyst.

The product of the UV initiated polymerization is typically a low to medium viscosity liquid containing dispersed microcapsules wherein the curing catalyst is completely enveloped within a layer of thermoplastic organic polymer. The catalyst composition can be distributed throughout the volume of the microcapsule or can be concentrated in one or more "core" areas.

When it is desired to prepare a microcapsule containing two layers of organic polymer, which constitute one embodiment of the present invention, the product of the initial photopolymerization is combined with a solubilized photopolymerizable monomer and a photoinitiator and then exposed to ultra-violet light for a sufficient time to polymerize the additional monomer. Alternatively, the polymerization can be initiated using other free radical generators such as organic peroxides or azo compounds that will not adversely affect the activity or structure of the microencapsulated curing catalyst.

The present inventors found that the second polymer layer substantially increases the storage stability of some curable organosiloxane compositions containing the present microencapsulated curing catalysts. If the encapsulated curing catalyst is one of the preferred platinum-containing hydrosilation catalysts, and the microcapsule contains two layers of polymer, a catalyst inhibitor can be present in the monomer solution used to apply the second polymer layer.

The monomer used to form the second layer of polymer on the microcapsule is not limited to the hydroxyl-containing ethylenically unsaturated compounds used for the initial polymerization reaction. Suitable monomers include all of the ethylenically unsaturated organic compounds that will polymerize under the conditions used to apply the second polymer layer to the microencapsulated catalyst.

Preferred monomers for use in forming the second polymer layer on the present microencapsulated curing catalysts include but are not limited to esters of acrylic or methacrylic acid and alcohols containing from 1 to about 4 carbon atoms. A typical ester of this type is methyl methacrylate.

To achieve long term storage stability the thermoplastic polymer(s) that encapsulates the catalyst should be insoluble in and impervious to the catalyst. In addition, the polymer should be insoluble in the curable organosiloxane compositions of this invention.

It will be understood that insolubility and impermeability are relative terms. Many solids will dissolve to a very limited extent in liquids in which they are considered insoluble, just as a limited degree of diffusion of a material through an "impermeable" layer will occur, given sufficient time. As used herein the terms "insoluble" and "impermeable" imply that the amount of encapsulant that dissolves in the catalyst and/or the curable composition and the amount of catalyst that diffuses through the walls of the microcapsules during storage of the curable organosiloxane composition are insufficient to cause curing of the composition. In some instances a slight increase in the viscosity during storage will be observed.

For the present microencapsulated catalysts to function effectively in a curable organosiloxane composition the organic polymer that encapsulates the catalyst must melt at or slightly below the desired curing temperature of the organosiloxane composition.

The present microcapsules are essentially spherical in contour with diameters of up to about 3 microns. Diameters of less than 3 microns are preferred to ensure that curable compositions containing these microcapsules will be optically transparent.

The present inventors found it difficult to encapsulate all of the catalyst in a microcapsule containing one layer of polymer when the metal portion of the coordinated curing catalyst exceeds about 0.5 weight percent of the monomer(s) used to prepare the microcapsules. The metal portion of the coordinated catalyst is preferably equivalent to less than about 0.3 weight percent of the monomer weight.

It is believed that only a portion of the initial monomer is used to form the microcapsules. The remainder is polymerized to form the liquid vehicle in which the microencapsulated curing catalyst is dispersed.

Application of a second polymer layer to the microcapsule reduces the likelihood of curing catalyst being present on the surface of the microcapsule or in the liquid medium containing the microcapsules. When a second polymer layer is present on the microcapsules the upper limit of coordinated catalyst that can be combined with the monomer used to form the initial microcapsule is substantially increased. Data in the accompanying examples demonstrate that curable compositions with long term storage stability can be prepared using a catalyst concentration equivalent to 1 weight percent of the metal portion of the catalyst, based on the weight of monomer used to prepare the initial microcapsule.

Curable Organosiloxane Compositions Containing the Present Microencapsulated Catalyst In addition to the microencapsulated curing catalyst described in the preceding section of this specification the curable organosiloxane compositions of this invention typically comprise a polyorganosiloxane, referred to hereinafter as ingredient (A), containing at least two of a first class of reactive groups that react during curing of the composition with a second class of reactive groups present on the curing agent. The organic groups bonded to the silicon atoms of the polyorganosiloxane are hydrocarbon radicals or substituted hydrocarbon radicals where the substituent is at least one halogen atom, most preferably chlorine or fluorine.

In one type of curable composition preferred for use with platinum-containing hydrosilation catalysts the reactive groups present on ingredient (A) are ethylenically unsaturated hydrocarbon radicals containing from two to about ten carbon atoms per molecule. Ingredient (B) is a polyorganohydrogensiloxane containing at least two silicon-bonded hydrogen atoms per molecule as the second class of reactive group. To ensure adequate crosslinking and an acceptable level of physical properties the sum of the average number of ethylenically unsaturated hydrocarbon radicals per molecule of polyorganosiloxane and the average number of silicon-bonded hydrogen atoms per molecule of polyorganohydrogensiloxane is greater than 4.

Ingredient (A) of the preferred curable compositions can be any polyorganosiloxane curable by a platinum-catalyzed hydrosilation reaction. The viscosity of ingredient (A) can range from a liquid to a high viscosity gum that will flow only under pressure.

The silicon-bonded hydrocarbon or substituted hydrocarbon radicals that constitute the organic groups bonded to silicon in (A) contain from 1 up to 20 or more carbon atoms. Preferably these radicals are lower alkyl, phenyl or a perfluoroalkylethyl radical such as 3,3,3-trifluoropropyl, this preference being based on the availability of the intermediates used to prepare ingredient (A). Most preferably at least a portion of the repeating units of (A) contain silicon bonded methyl radicals, and the reactive ethylenically unsaturated hydrocarbon radical present in (A) is terminally unsaturated. Most preferably this radical is vinyl, allyl or 5-hexenyl.

The reactive groups present on ingredient (A) can be present anywhere in the molecule. In preferred embodiments of ingredient (A) these groups are present on at least the terminal positions of the molecule in the form of dimethylvinylsiloxy, methylphenylvinylsiloxy or dimethyl-1-hexenyl groups.

If the curable composition is a liquid or pasty material, the viscosity of (A) is preferably from 1 to 500 Pa.s. Polymers of this type are well known and commercially available. In addition to diorganosiloxane and terminal triorganosiloxy groups ingredient (A) can contain one or more monoorganosiloxane units per molecule, resulting in branching of the polymer molecule. Polymers of this type are described in U.S. Pat. No. 3,284,406 to Nelson, which issued on Nov. 8, 1966. Alternatively, ingredient (A) can be a semi-solid material, known in the art as a gum, exhibiting a viscosity of up to 1000 Pa.s or greater at 25 degrees C. Curable compositions containing this type of polydiorganosiloxane are typically prepared by blending the ingredients under high shear using a two- or three roll rubber mill or dough-type mixer.

Surprisingly it has been found that the microencapsulated catalysts of this invention do not rupture or collapse under the conditions used to process these high consistency organosiloxane compositions. The catalysts can therefore be incorporated this type of curable composition using conventional blending methods.

In this preferred embodiment of the present curable compositions ingredient (A) is cured by a hydrosilation reaction between the ethylenically unsaturated hydrocarbon radicals of this ingredient and silicon-bonded hydrogen atoms of an organohydrogensiloxane, ingredient (B). In a typical composition one or more polydiorganosiloxanes containing two ethylenically unsaturated hydrocarbon radicals react with a relatively low molecular weight, liquid organohydrogensiloxane containing an average of at least three silicon bonded hydrogen atoms per molecule. The remaining organic groups bonded to the silicon atoms of ingredient (B) are hydrocarbon or substituted hydrocarbon radicals as defined for the organic groups of ingredient (A).

Ingredient (B) can contain from as few as four silicon atoms per molecule up to an average of 20 or more, and exhibit a viscosity of up to 10 Pa.s or higher at 25 degrees C. Ingredient (B) contains repeating units of the formulae $HSiO_{1.5}$, $RHSiO$ and/or $R_2HSiO_{0.5}$. The molecules of this ingredient may also include one or more monoorganosiloxane, diorganosiloxane, triorganosiloxy and $SiO_{4/2}$ units that do not contain silicon bonded hydrogen atoms. In these formulae R is a monovalent hydrocarbon radical selected from the same group defined hereinabove for the hydrocarbon radicals of ingredient (A).

Alternatively, ingredient (B) can be a cyclic compound containing at least 4 organohydrogensiloxane units of the formula RHSiO or a compound of the formula $HR_2SiO[(HR_2SiO)_aSiR_2H]$, where a is at least 1.

Most preferably R is methyl and ingredient (B) is a linear trimethylsiloxy terminated polymethylhydrogensiloxane or a dimethylsiloxane/methylhydrogensiloxane copolymer containing an average of from 5 to about 50 repeating units per molecule of which from 30 to 100 percent are methylhydrogensiloxane units.

The molecular weights of ingredients (A) and (B) together with the number and distribution of the silicon-bonded hydrogen atoms and ethylenically unsaturated hydrocarbon radicals within these ingredients will determine the location of crosslinks in the cured product, which can range from a glasslike resin to an elastomer to a gel.

The concentration of crosslinks per unit volume is often referred to as the "crosslink density" and determines certain physical properties of the cured elastomer, particularly hardness, tensile strength and elongation. The particular combinations of polydiorganosiloxane(s) and curing agent(s) yielding the desired combination of physical properties can readily be determined by routine experimentation with a knowledge of this invention.

The molar ratio of silicon bonded hydrogen atoms to vinyl or other ethylenically unsaturated hydrocarbon radicals present in the preferred curable compositions of this invention is a major factor in determining the properties of the cured elastomer. Because of the difficulty often experienced in achieving a complete reaction between all of the silicon bonded hydrogen atoms and all of the vinyl or other ethylenically unsaturated hydrocarbon radicals present in the reaction mixture, it is desirable to have an stoichiometric excess of one of these species in a curable composition. A ratio of from 1.0 to 1.6 silicon bonded hydrogen atoms per vinyl or other ethylenically unsaturated hydrocarbon radical has been found to yield optimum combinations of properties.

The preferred ratio for a given composition will be determined at least in part by the average molecular weight of ingredient (A) and the type of curing agent.

A second type of curable composition cures in the presence of moisture. In this class of compositions ingredient (A) is a silanol-containing polyorganosiloxane, most preferably a substantially linear polydiorganosiloxane wherein the silanol groups are located at the terminal positions of the molecule. The curing agent, ingredient (B), is an organosilicon compound, typically a silane, with at least three silicon-bonded alkoxy groups containing from 1 to about 4 carbon atoms. The curing catalysts for these types of hydrolyzable compositions that can be microencapsulated in accordance with the present invention are the coordination complexes of chelated titanium compounds discussed in this specification. As disclosed earlier in this specification, because of the higher concentration of titanium-containing catalysts required relative to the preferred platinum-containing hydrosilation catalysts, curable compsitions containing the microencapsulated titanium catalysts may not be optically transparent.

The consistency of the present compositions can vary from a flowable liquid to a semi-solid paste to a high consistency gum that will flow only under high shear. In addition to the aforementioned ingredients the compositions can contain other additives including but not limited to reinforcing and nonreinforcing fillers, treating agents for these fillers, pigments processing aids, stabilizers and flame retardants. It should be understood that some of these additives will detract from the optical transparency of the curable and cured organosiloxane compositions containing the preferred platinum-containing hydrosilation catalysts.

The amount of microencapsulated curing catalyst present in the curable compositions of this invention is typically not restricted so long as there is a sufficient amount to accelerate the reaction between ingredients (A) and (B). Because of the small particle size of the present microencapsulated curing catalysts it is possible to use catalyst concentrations equivalent to as little as 1 part by weight or less of coordinated platinum-group metal per million parts of curable composition and still obtain a uniformly cured product.

EXAMPLES

The following examples describe preferred embodiments of the present microencapsulated curing catalysts, methods for preparing these catalysts and one-part, storage stable curable organosiloxane compositions containing the microencapsulated curing catalysts. The examples should not be interpreted as limiting the scope of the invention defined in the accompanying claims. Unless otherwise specified all parts and percentages are by weight and all viscosities were measured at 25 degrees C.

GENERAL PROCEDURES (EXAMPLES 1-7)

A. The Microencapsulation Process

1. Single Polymer Layer

The compositions used to prepare the microencapsulated catalyst contained the following ingredients:

100 parts by weight of isopropanol;

0-1 part of surfactant (Triton X-100, available from Rohm and Haas);

10-25 parts of either 2-hydroxyethyl acrylate (HEA) or 2-hydroxyethyl methacrylate (HEMA);

0.1-0.2 part of 2-hydroxy-2-methyl-1-phenylpropan-1-one;

as the platinum catalyst inhibitor from 0-2.5 part of one of the following: diethyl fumarate (DEF), bis(2-methoxyisopropyl maleate) (MAL), 1-ethynyl-1-cyclohexanol (ETCH) and from 2800 to 11,000 parts per million parts of monomer of a platinum catalyst containing 4.2 weight percent platinum and 95.8 weight percent divinyltetramethyldisiloxane.

The composition was placed in a quartz tube equipped with a mechanically operated stirrer and nitrogen inlet. The contents of the tube was then exposed for from 1 to 2 hours to the radiation from a 150 watt medium pressure mercury vapor lamp at a distance of from one to two inches from the lamp.

Following the exposure period the resultant liquid mixture was heated at a temperature of 45° C. under reduced pressure to remove the isopropanol. Examination of the final product using an electron microscope revealed a bimodal distribution of particle diameters, with one portion in the 2 to 3 micron range and the second portion less than one micron.

2. Formation of the Second Polymer Layer

The first portion of the preparation is identical to that described for microcapsules containing a single layer of polymer. The resultant dispersion of microcapsules was then placed in a quartz tube together with 2-hydroxyethyl acrylate (HEA) or methyl methacrylate (MMA), and the same photoinitiator and inhibitors used to prepare the single layer microcapsules. The amounts of these ingredients are specified in the following examples. Isopropanol was added as required to compensate for volume loss during processing.

The resultant mixture is then exposed to ultrviolet light to polymerize the monomer, thereby forming a second polymer layer on the microcapsules. Any isopropanol added is removed by heating under reduced pressure.

B. Evaluation of the Microencapsulated Catalysts

The encapsulated platinum catalyst was combined with a homogeneous blend of (1) a dimethylvinylsiloxy-terminated polydimethylsiloxane exhibiting a viscosity of about 400 Pa.s and (2) a trimethylsiloxy-terminated copolymer containing an average of three dimethylsiloxane and five methylhydrogensiloxane units per molecule. The concentration of microencapsulated catalyst in the curable composition was typically equivalent to 1 ppm of platinum, based on the total weight of the curable composition. The curable composition was a colorless, transparent liquid.

The pot life of the curable composition was evaluated by observing the time interval during which the composition remained flowable when stored in a closed container under ambient conditions or at 60° C.

The cure time of compositions was measured by placing 0.5 g. of the composition contained in a glass vial in an oven maintained at a temperature of 150° C. and observing the minimum time interval required for conversion of the liquid composition to an elastomer.

EXAMPLE 1

This example compares the storage stability of (a) a microencapsulated catalyst composition of this invention without the optional inhibitor with (b) a composition containing the same ingredients but which had not been exposed to UV light to polymerize the monomer and (c) a composition which did not contain any monomer. All compositions contained 100 parts of isopropyl alcohol and a catalyst concentration equivalent to 2800 ppm, based on monomer weight, and 1 ppm based on the weight of the curable composition.

| Sample | Monomer (Parts) | Irrad. Time (min.) | Cure Time (sec.) | Pot Life (days) |
|--------|-----------------|--------------------|--------------------|-----------------|
| (a) | HEA, 10 | 70 | 285 | 3.5 |
| (b) | HEA, 10 | 0 | 240 | 0.4 |
| (c) | 0 | 0 | 30 | 0.03 |

HEA = 2-hydroxyethyl acrylate
Irrad. Time = Exposure time to UV light

Even in the absence of a platinum catalyst inhibitor the storage stability of the curable composition is nearly 9 times that observed for the composition containing the same ingredients but without polymerization to form the microencapsulated catalyst. The cure times of the two compositions are equivalent.

EXAMPLE 2

This example demonstrates that ethanol can be used as the solvent for preparation of a microencapsulated platinum-containing hydrosilation catalyst. The two compositions contained 100 parts of the alcohol, 10 parts of 2-hydroxyethyl acrylate, an amount of catalyst equivalent to 2800 ppm of platinum based on the weight of monomer and 1 ppm of platinum based on the total weight of the curable composition, and the irradiation time was 70 minutes.

| Solvent | Pt Conc. | Cure Time (sec.) | Pot Life (days) |
|---------|----------|------------------|-----------------|
| Isopropanol | 2800 | 285 | 3.5 |
| Ethanol | 2800 | 270 | 6.0 |

This example demonstrates the improvement in storage stability of curable compositions achieved when a conventional platinum catalyst inhibitor is present in the composition. All of the compositions contained 100 parts of isopropanol as the solvent for the polymerization reaction, 10 parts of 2-hydroxyethyl acrylate as the monomer and 1 part of the inhibitor.

The composition containing diethyl fumarate (DEF) as the inhibitor also contained 1 part of an anionic surfactant (Triton X-100).

| Inhibitor | Irrad. Time (minutes) | Pt Conc. (ppm) | Cure Time (Seconds) | Pot Life (days) |
|-----------|----------------------|----------------|---------------------|-----------------|
| DEF | 70 | 12* | 300 | >58[a] |
| MAL | 100 | 1** | 300 | >16[a] |
| ETCH | 100 | 1** | 270 | >27[a] |

DEF = Diethyl fumarate
MAL = Bis(2-methoxyisopropyl)maleate
ETCH = 1-ethynyl-1-cyclohexanol
* = Platinum content was 1200 ppm based on monomer
** = Platinum content was 2800 ppm, based on monomer
[a] = Composition had not cured at the end of this time interval.

EXAMPLE 4

This example demonstrates the use of 2-hydroxyethyl methacrylate as the monomer for preparing the microencapsulated catalyst.

Each of the compositions contained 10 parts of monomer, a concentration of catalyst equivalent to 2800 ppm of platinum in the monomer and 1 ppm in the curable composition and 1 part of diethyl fumarate as the catalyst inhibitor. The solvent for the irradiated composition was isopropanol.

| Solvent (Parts) | Irrad. Time (minutes) | Cure Rate (seconds) | Pot Life (days) |
|-----------------|----------------------|---------------------|-----------------|
| 1 | 70 | 210 | >31[a] |
| 0 | 0 | 120 | 3 |

[a] = Sample had not cured at the end of this time interval.

EXAMPLE 5

This example demonstrates the existence of an upper limit on the concentration of platinum of about 5000 ppm (0.5 weight percent) relative to monomer for a storage stable curable composition containing microcapsules with a single layer of polymer. Each of the compositions contained 1 part of diethyl fumarate as the catalyst inhibitor, 10 parts of 2-hydroxyethyl acrylate as the monomer, and the curable composition contained 1 ppm of platinum.

| Pt Conc.* (ppm) | Irrad. Time (Minutes) | Cure Time (Seconds) | Pot Life (Days) |
| --- | --- | --- | --- |
| 5200 | 120 | 90 | 1 |
| 5200 | 0** | 120 | 0.3 |
| 11000 | 120 | 60 | 0.3 |
| 11000 | 0** | 60 | 0.3 |

\* = Based on monomer
\*\* = monomer did not polymerize

It appears that not all of the catalyst is microencapsulated in the polymer layer when the concentration of the metallic portion of the curing catalyst exceeds about 0.5 percent of the monomer weight. When the platinum concentration was 1 percent of the monomer weight the pot life was no better than a control which had not been polymerized to form a microencapsulated catalyst.

EXAMPLE 6

This example describes a method for preparing a microencapsulated catalyst having two polymer layers and the improved storage stability achieved using these catalysts.

The microencapsulated catalyst was prepared using steps one and two of the general procedure described in the preceding section of this specification using 100 parts of isopropanol, 10 parts of 2-hydroxyethyl acrylate and 1 part of diethyl fumarate in the initial polymerization reaction mixture. An additional 10 parts of 2-hydroxyethyl acrylate was added for application of the second polymer layer. The catalyst concentration in the initial polymerization mixture was equivalent to 1 weight percent of platinum, based on monomer, and the catalyst concentration in the curable composition was equivalent to 1 ppm of platinum.

One of the two compositions used for comparative purposes contained no isopropanol, 10 parts of 2-hydroxyethyl acrylate, 1 part of diethyl fumarate and an amount of catalyst in the initial mixture equivalent to 1 weight percent of platinum based on monomer and a catalyst concentration in the curable composition of 1 ppm. The catalyst concentration in the second comparative composition was equivalent to 0.52 weight percent of platinum, based on monomer, and the curable composition contained 1 ppm of platinum. The initial composition contained 10 parts of 2-hydroxyethyl acrylate and 0.5 part of diethyl fumarate.

| Polymerization Step No. | Irrad. Time (Min.) | Cure Time (Sec.) | Pot Life (Days) |
| --- | --- | --- | --- |
| 1 | 70 | 75 | 0.5 |
| 2 | 70 | 270 | 16 |
| 0* | 0 | 60 | 0.3 |
| 0** | 0 | 120 | 0.3 |

\* = Comparative composition, contained 1 percent Pt based on monomer
\*\* = Comparative composition, contained 0.5 percent Pt based on monomer

EXAMPLE 7

This example demonstrates a 2-step polymerization process for preparing the microencapsulated catalyst substituting methyl methacrylate for 2-hydroxyethyl acrylate as the monomer for the second polymerization step and using 1-ethynyl-1-cyclohexanol as the platinum catalyst inhibitor. The initial polymerization reaction mixture for all samples contained 100 parts of isopropanol, 10 parts of 2-hydroxyethyl acrylate, 1 part of 1-ethynyl-1-cyclohexanol as the platinum catalyst inhibitor and an amount of catalyst equivalent to 0.48 weight percent, based on monomer. No inhibitor was added for the second polymerization step. The irradiation time for all polymerizations was 100 minutes and all of the curable compositions contained 1 ppm, based on platinum, of the curing catalyst.

| Sample No. | Polymerization Step No. | Cure Time (Sec.) | Pot Life (days) Ambient | 60° C. |
| --- | --- | --- | --- | --- |
| 1* | 1 | 210 | 1 | NE |
|    | 2 | 300 | >37$^a$ | 13 |
| 2** | 1 | 210 | 1 | NE |
|    | 2 | 240 | >32$^a$ | NE |

\* = Monomer for second polymerization was 2-hydroxyethyl acrylate
\*\* = Monomer for second polymerization was methyl methacrylate
$^a$ = Sample had not cured at the end of the time interval.
NE = Not evaluated All of the curable and cured compositions described in examples 1–7 were optically transparent.

EXAMPLE 8

This example demonstrates the ability of titanium catalysts to be encapsulated in accordance with the present method.

The catalysts used were a chelated titanium compound (T1) available as Tyzor(®) DC from E. I. DuPont de Nemours and Co. and a non-chelated compound available as Tyzor(®) from the same supplier. A chelated compound (T2) was prepared by combining 1 part of the non-chelated compound with 2 parts of 2-hydroxyethyl acrylate and allowing the resultant mixture to stand for about 1 hour under ambient conditions.

The two chelated titanium compounds were encapsulated by combining 0.18 part of the titanium compound (T1 or T2) with 100 parts of isopropanol, 10 parts of 2-hydroxyethyl acrylate and 0.2 parts of 2-hydroxy-2-methyl-1-phenylpropan-1-one in a quartz tube equipped with a nitrogen inlet and mechanically operated stirrer. The contents of the tube were exposed to the light from a 150 watt medium pressure mercury vapor lamp for 70 minutes at a distance of from 1 to 2 inches. Following completion of the exposure period the resultant solution was heated at a temperature of 45° C. under reduced pressure to remove the isopropanol. An electron photomicrograph indicated the diameter of the resultant particles of microencapsulated catalyst to be from 1 to 2 microns.

Curable compositions were prepared by combining the amount of encapsulated catalyst specified in the following table with 100 parts of a silanol-terminated polydimethylsiloxane containing an average of 80 dimethylsiloxane units per molecule and 4 parts of n-propyl orthosilicate. The times required form the resultant compositions to cure at room temperature and at temperatures of 60° and 150° C. are reported in the following table.

| Titanium Compound (parts) | Encapsulated | Cure Times Room Temp. | 60° C. | 150° C. |
| --- | --- | --- | --- | --- |
| T1 (0.33) | No | >24 Hours$^b$ | 4 Hours | NE |
| T1 (60)$^a$ | Yes | >24 Hours$^b$ | 24 Hours | NE |
| T2 (0.3) | No | 30 Seconds | NE | |
| T2 (20)$^a$ | Yes | >24 Hours$^b$ | 8 Hours | 8 Minutes |

$^a$ = Parts based on microcapsules
$^b$ = Sample had not cured at the end of the time interval
NE = Not evaluated That which is claimed is:

1. In an improved one-part, storage stable, heat curable organosiloxane composition comprising A. a liquid or gum type curable polyorganosiloxane containing at least two of a first reactive group;

B. a curing agent for said composition selected from organosilicon compounds containing at least two of a second reactive group that reacts with said first reactive group to yield a cured material, where said first reactive group is a silicon-bonded hydroxyl group or silicon-bonded terminally unsaturated alkenyl radical, said second reactive group is silicon-bonded hydrogen when said first reactive group is silicon-bonded hydroxyl or silicon-bonded alkenyl, or said second reactive group is silicon-bonded alkoxy only when said first reactive group is silicon-bonded hydroxyl, the concentration of said curing agent relative to said curable polyorganosiloxane (A) is sufficient to cure said composition in the presence of a curing catalyst, and the sum of the average number of said first reactive groups per molecule of said polyorganosiloxane (A) and the average number of said second reactive groups per molecule of said curing agent (B) is greater than 4, C. an amount of a liquid or solubilized curing catalyst sufficient to promote curing of said composition, where said catalyst is microencapsulated within a matrix or layer of a solid organic polymer derived from an ethylenically unsaturated organic compound, the improvement comprising preparing said microencapsulated curing catalyst by (1) forming a solution comprising (a) a precursor for said organic polymer selected from that polymerize in the presence of ultraviolet light, where said precursor is a hydroxyl-containing ethylenically unsaturated organic compound selected from the group consisting of vinyl esters of carboxylic acids, hydroxyl-containing ethylenically unsaturated carboxylic acids, esters of said ethylenically unsaturated carboxylic acids, and esters derived from an ethylenically unsaturated carboxylic acid and an alcohol containing at least two hydroxyl groups per molecule, (b) a photoinitiator in an amount sufficient to initiate polymerization of said precursor in the presence of ultraviolet light to form said organic polymer, (c) said curing catalyst in the form of a solubilized coordination complex of a metal with either (i) an ethylenically or acetylenically unsaturated organic compound or (ii) the residue remaining following removal of the hydrogen atom from the carboxyl group of a carboxylic acid, said metal being selected from the group consisting of platinum group metals and titanium, and (d) a solvent selected from the group consisting of mono- and polyhydric alcohol (2) irradiating said solution with an amount of ultraviolet light sufficient to polymerize said precursor to form the organic polymer portion of said microencapsulated catalyst, where said microencapsulated catalyst is formed as a dispersion of solid particles in said solution, a majority of said particles are less than one micron in diameter and substantially none exceed three microns in diameter.

2. A composition according to claim 1 where said particles comprise said catalyst and a single layer of solid polymer formed from said precursor.

3. A composition according to claim 2 where said hydroxylcontaining organic compound is 2-hydroxyethyl acrylate.

4. A composition according to claim 1 where the maximum concentration of said catalyst, based on the weight of said precursor, present during preparation of the microencapsulated catalyst is equivalent to 0.5 weight percent of said metal.

5. A composition according to claim 1 where said particles comprise an inner and outer polymer layer, said inner layer contains substantially all of said catalyst and is formed from said precursor, and the outer layer is formed by polymerization of additional precursor or from a hydroxyl-free photopolymerizable monomer, where said additional precursor or monomer is added to said solution following formation of said dispersion.

6. A composition according to claim 5 where said hydroxyl-free monomer is an ester derived from acrylic acid or methacrylic acid and an alcohol containing from 1 to 4 carbon atoms and said hydroxyl-containing organic compound is 2-hydroxyethyl acrylate.

7. A composition according to claim 1 where said solvent is a monohydric alcohol containing from 2 to 10 carbon atoms; and said precursor constitutes from 1 to 50 percent of the weight of said solution.

8. A composition according to claim 7 where said curing catalyst is a coordination complex of a metal from the platinum group of the periodic table, where the complexing agent is at least one member selected from the group consisting of ethylenically unsaturated organosilicon compounds and platinum catalyst inhibitors that are, in turn, selected from the group consisting of ethylenically unsaturated organic compounds and acetylenically unsaturated precursor;

said solvent is selected from ethanol, the isomeric propanols, the isomeric butanols, ethylene glycol and propylene glycol;

the concentration of said organic compound is from 1 to 20 percent, based on the weight of said first solution;

said first reactive group is an ethylenically unsaturated hydrocarbon radical containing from 2 to 10 carbon atoms, said second reactive group is a silicon-bonded hydrogen atom, and said composition is optically transparent.

9. A composition according to claim 8 where said metal is platinum, said solution contains a platinum catalyst inhibitor, and said first reactive group is vinyl or 5-hexenyl.

10. A composition according to claim 9 where said inhibitor is selected from the group consisting of (a) acetylenically unsaturated alcohols and (b) esters of ethylenically unsaturated acids and alcohols containing from 1 to 4 carbon atoms.

11. A composition according to claim 10 where said inhibitor is selected from the group consisting of methylbutynols, esters of maleic acid and esters of fumaric acid and from 25 to 500 moles of inhibitor are present in said liquid composition per mole of said catalyst.

* * * * *